(12) United States Patent
Dalpez et al.

(10) Patent No.: US 11,346,269 B2
(45) Date of Patent: May 31, 2022

(54) VEHICLE TANK FOR RECEIVING A LIQUID MEDIUM, AND VEHICLE HAVING SUCH A VEHICLE TANK

(71) Applicant: Röchling Automotive SE & Co. KG, Mannheim (DE)

(72) Inventors: Stefano Dalpez, Male (IT); Davide Monsorno, Trento (IT); Ivan De Metri, Bolzano (IT); Francesca Brunori, Laives (IT); Fabrizio Chini, Isera (IT); Luca Marini, Besenello (IT); Francesca Sartori, Trento (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 17 days.

(21) Appl. No.: 17/095,638

(22) Filed: Nov. 11, 2020

(65) Prior Publication Data
US 2021/0148274 A1 May 20, 2021

(30) Foreign Application Priority Data
Nov. 18, 2019 (DE) ...................... 10 2019 131 126.8

(51) Int. Cl.
*F01N 13/00* (2010.01)
*F01N 3/28* (2006.01)

(52) U.S. Cl.
CPC ............ *F01N 13/00* (2013.01); *F01N 3/2889* (2013.01); *F01N 2610/10* (2013.01); *F01N 2610/1406* (2013.01)

(58) Field of Classification Search
CPC ......... F01N 2610/10; F01N 2610/1406; F01N 2610/1486
See application file for complete search history.

(56) References Cited

U.S. PATENT DOCUMENTS

| 7,650,878 B2 * | 1/2010 | Kleinberger | ........... F02M 31/16 |
| | | | 123/557 |
| 10,690,418 B2 | 6/2020 | Chini et al. | |
| 2009/0183778 A1 * | 7/2009 | Wildegger | .............. B60S 1/488 |
| | | | 137/340 |
| 2014/0373514 A1 * | 12/2014 | Bauer | ................... F01N 3/2066 |
| | | | 137/340 |

(Continued)

FOREIGN PATENT DOCUMENTS

| DE | 102008006630 A1 * | 7/2009 | ............... B60H 1/00 |
| DE | 102013211183 A1 | 12/2014 | |
| DE | 102015015442 A1 | 6/2017 | |

OTHER PUBLICATIONS

German Search Report for corresponding DE 10 2019 131 126.8 dated Jun. 29, 2020, 6 pgs.

(Continued)

*Primary Examiner* — Jonathan R Matthias
(74) *Attorney, Agent, or Firm* — Rankin, Hill & Clark LLP (57) ABSTRACT

A vehicle tank for receiving a liquid medium, encompassing: a tank body having a tank wall; a heat exchanger arranged in an interior of the tank body, the heat exchanger having a first heat-exchanger heat delivery surface that faces toward the tank wall and is spaced away from the tank wall; and an electric heating apparatus that is arranged in the interior of the tank body,
the electric heating apparatus being arranged between the first heat-exchanger heat delivery surface and the tank wall.

20 Claims, 4 Drawing Sheets

(56) References Cited

U.S. PATENT DOCUMENTS

2017/0257911 A1    9/2017   Chini et al.
2019/0040782 A1    2/2019   Zenner et al.

OTHER PUBLICATIONS

Espacenet Bibliographic data:DE 102013211183 (A1), Published Dec. 18, 2014, 1 pg.
Espacenet Bibliographic data:DE 102015015442 (A1), Published Jun. 8, 2017, 1 pg.

* cited by examiner

VEHICLE TANK FOR RECEIVING A LIQUID MEDIUM, AND VEHICLE HAVING SUCH A VEHICLE TANK

This Application claims priority in German Patent Application DE 10 2019 131 126.8 filed Nov. 18, 2019, which is incorporated by reference herein.

The present invention relates to a vehicle tank for receiving a liquid medium, encompassing: a tank body having a tank wall; a heat exchanger arranged in an interior of the tank body, the heat exchanger comprising a first heat-exchanger heat delivery surface that faces toward the tank wall and is spaced away from the tank wall; and an electric heating apparatus that is preferably spaced away from the heat exchanger and is arranged in the interior of the tank body.

BACKGROUND OF THE INVENTION

Heating apparatuses of this kind serve in particular to melt aqueous urea solution in a tank, in systems for exhaust emissions control utilizing selective catalytic reduction or injection of water into an intake duct of an internal combustion engine or into its combustion chamber; the latter application can also be utilized in order to increase performance. A heating apparatus of this kind is known, for instance, from the document DE 10 2013 211 183 A1, both an electric heating apparatus and a heat exchanger being used. In the case of the vehicle tank from DE 10 2013 211 183 A1, however, a relatively high energy expenditure is implemented in order to rapidly furnish a melted medium received in the vehicle tank. In general, the efficiency of the heat exchanger increases only slowly after a vehicle is initially operated, since the cooling water flowing through it must first be heated.

SUMMARY OF THE INVENTION

An object of the present invention is therefore to furnish a vehicle tank in which a frozen medium can be quickly and energy-efficiently melted and made available.

This object is achieved according to the present invention by a vehicle tank according to the claims.

In particular, the invention furnishes a vehicle tank for receiving a liquid medium, encompassing: a tank body having a tank wall; a heat exchanger arranged in an interior of the tank body, the heat exchanger comprising a first heat-exchanger heat delivery surface that faces toward the tank wall and is spaced away from the tank wall; and an electric heating apparatus that is preferably spaced away from the heat exchanger and is arranged in the interior of the tank body, the electric heating apparatus being arranged between the first heat-exchanger heat delivery surface and the tank wall. A "heat exchanger" is, in particular, a device that transfers thermal energy from a thermal fluid, in particular cooling water, heated by a vehicle, from a cooling water circuit of a vehicle to the medium surrounding it, in particular to the, if applicable, frozen, previously liquid medium in the vehicle tank. The medium in the vehicle tank can be an agent for bringing about selective catalytic reduction in an exhaust gas, for instance an aqueous urea solution; or it can be water for injection into the intake duct or into a combustion chamber of an internal combustion engine. When a "frozen medium" is referred to in this Application, what is meant thereby is the medium that is received in liquid fashion in the vehicle tank during use as intended, which is frozen, for instance, because of ambient temperatures. In a preferred embodiment, the tank wall can be embodied as a tank bottom. The tank wall can be embodied as a side wall of the tank, or as a tank ceiling.

A withdrawal arrangement by means of which the liquid medium can be withdrawn from the vehicle tank can be arranged in the vehicle tank, in particular in a vehicle tank sump or in a surge tank of the vehicle tank. The withdrawal arrangement can be, for instance, a tube end, a tube fitting, an aspiration screen, or an aspiration filter, which are respectively arranged at one end of a withdrawal conduit.

Thanks to the arrangement of the electric heating apparatus between the first heat-exchanger heat delivery surface and the tank wall, on the one hand when a frozen medium is present in the vehicle tank, the frozen medium becomes melted, in particular by the electric heating apparatus, when the vehicle starts, so that the liquid medium resulting therefrom is available to the vehicle, promptly after initial operation of the vehicle, for withdrawal at the withdrawal arrangement; and on the other hand a channel becomes melted into the frozen medium, e.g. in a limited space in which the electric heating apparatus is arranged between the tank wall and heat exchanger, so that as soon as a warm thermal fluid flows through the heat exchanger, the liquid medium generated upon melting by the heat exchanger can be carried through that channel to the withdrawal arrangement, so that no delay occurs due to the fact that the medium melted by the heat exchanger must first melt out a path to the withdrawal arrangement. This allows a reduction in the energy for melting out the channel between the heat exchanger and the withdrawal arrangement; in particular, electrical energy that would need to be delivered to the electric heating apparatus is reduced. In a vehicle, it is only with a large expenditure of fuel, with relatively low efficiency, that electrical energy can be generated, stored, and furnished.

The heat exchanger is preferably arranged, in particular suspended, or supported or retained by stilts, pegs, or struts, in the vehicle tank spaced away from a wall of the vehicle tank. As a result, the heat exchanger can deliver thermal energy substantially in all directions to the, possibly frozen, medium present in the tank. It is furthermore possible, with appropriate suspension of the heat exchanger, for the melting process of the frozen medium to exhibit little sensitivity to the fill level of the tank.

The heat exchanger can furthermore be manufactured, in particular injection-molded or blow-molded, from plastic. A heat exchanger embodied in planar fashion can thereby be adapted in particularly simple fashion to a shape of the vehicle tank, and three-dimensional structures, for example fins or plates, that are substantially perpendicular to the planar extent of the heat exchanger can be embodied on the heat exchanger upon manufacture thereof, in order to increase the efficiency of the heat exchanger in the context of melting of the frozen medium present in the tank. Polymers having high thermal conductivity, such as polypropylene or graphene-filled polypropylene, are preferred as a plastic material for constituting the heat exchanger. In the context of manufacture by injection molding, partial shells, in particular half-shells, are constituted and are assembled into a heat exchanger. The heat exchanger can have an external shape in the form of a plate. In particular, the heat exchanger can have an external shape substantially in the form of a continuous plate or, alternatively, in the form of a plurality of separate, physically distanced plates. The continuous plate that describes the external shape in the one embodiment can be substantially flat or curved. In the alternative embodiment as well, in which the external shape is described by a plurality of separately, physically distanced plates, one of, each of a number of, or each of the plates can be flat or curved.

In particular, a) a gap that defines a gap thickness direction can be embodied between the first heat-exchanger heat delivery surface and the tank wall, the vehicle tank having a reference direction proceeding parallel to the gap thickness direction; and/or b) the vehicle tank can be embodied to be installed as intended in a vehicle, the vehicle having a vehicle reference direction that is substantially parallel to the effective direction of gravity in a normal position of the vehicle, the vehicle, in the normal position in an operationally ready state, standing on a flat surface that extends perpendicularly to the effective direction of gravity, and the vehicle tank having a reference direction that, when the vehicle tank is installed as intended in the vehicle, extends parallel to the vehicle reference direction. With the vehicle tank installed as intended in a vehicle, in particular, the two reference directions according to a) and b) can coincide or be parallel. This is the case in particular when, in a preferred embodiment, the tank wall is embodied as a tank bottom. In case b), the heat exchanger can be arranged in the vehicle tank substantially parallel to the reference direction; when the vehicle tank is installed in a vehicle that is in its normal position, that orientation of the heat exchanger in the vehicle tank can be referred to as "vertical."

In a preferred embodiment, the electric heating apparatus comprises a first heating-apparatus heat delivery surface facing toward the first heat-exchanger heat delivery surface, and a projection of the first heat-exchanger heat delivery surface in the reference direction at least partly overlaps the first heating-apparatus heat delivery surface in an overlap region of the first heating-apparatus heat delivery surface, the surface area of the overlap region being greater than a predetermined percentage differing from zero, for instance 25%, preferably greater than 50%, in particular greater than 70%, particularly preferably being equal to 100% of the surface area of the first heating-apparatus heat delivery surface. The percentage, differing from zero, of the surface area of the first heating-apparatus heat delivery surface is preferably predetermined.

A "projection" of a surface onto another surface (here, the overlap region constituting a sub-region of the first heating-apparatus heat delivery surface) in the reference direction is understood in particular as a parallel projection of the one surface onto the other surface, the imaging rays that define the parallel projection proceeding parallel to the reference direction.

In particular, in the region between the overlap region and the first heat-exchanger heat delivery surface, the electric heating apparatus, upon energization, can melt the frozen medium present in the tank and the electric heating apparatus can simultaneously, upon energization, melt a channel into the frozen medium between the heat exchanger and the electric heating apparatus, in order to define a flow direction of the melted medium and thus adapt it to the desired use.

In a further embodiment, the electric heating apparatus can comprise a second heating-apparatus heat delivery surface arranged oppositely from the first heating-apparatus heat delivery surface, and a ratio (ratio of A1 to A2) of a maximally occurring spacing A1 between the second heating-apparatus heat delivery surface and the tank wall to a maximally occurring spacing A2 between the overlap region and the first heat-exchanger heat delivery surface is less than 5 (A1/A2<5), particularly preferably is less than 1 (A1/A2<1), in particular is ⅔ (A1/A2=⅔). The inventors have discovered that with a spacing ratio of this kind, in particular when A1=10 mm and A2=15 mm, the time span between initial operation of the vehicle and the point in time at which melted medium is ready at the withdrawal arrangement is greatly reduced, in particular can even be minimized with certain embodiments. If a vehicle tank sump happens to be provided in the tank wall which is embodied in particular as a tank bottom, the maximum spacing A1 that occurs between the second heating-apparatus heat delivery surface and the tank wall is preferably to be considered outside the vehicle tank sump, and to be utilized for calculating the above-described ratio.

It is preferred that the vehicle tank furthermore encompass a withdrawal arrangement, arranged on the tank body, for withdrawing the liquid medium from the tank body; and that the electric heating apparatus surround the withdrawal arrangement at least in portions, in particular entirely; the electric heating apparatus in particular comprising a heating-apparatus opening that is embodied in a thickness direction of the electric heating apparatus and preferably surrounds the withdrawal arrangement at least in portions. As a result of this arrangement, the electric heating apparatus directly melts out an access to the withdrawal arrangement upon energization. If the electric heating apparatus is embodied from several separate parts spaced away from one another, an interstice between two of those parts which are directly adjacent to one another can constitute the heating-apparatus opening. In this case the heating-apparatus opening can be delimited, in the region in which it is not delimited by the individual parts of the electric heating apparatus, by surfaces, in particular plane segments, that respectively connect two individual parts of the electric heating apparatus. The heating-apparatus opening can also, in portions, not be surrounded by the heating apparatus in a circumferential direction. In this case the heating-apparatus opening can be delimited, in the region in a circumferential direction in which it is not delimited by the electric heating apparatus, by a surface, in particular a plane segment, delimited by the electric heating apparatus. The heating-apparatus opening is embodied in particular as a passthrough opening.

It is furthermore preferred that the electric heating apparatus comprise a heating-apparatus opening which is embodied in a thickness direction of the electric heating apparatus and whose projection in the reference direction overlaps with the withdrawal arrangement. The result thereof is that a channel to the withdrawal arrangement in the frozen medium in the vehicle tank is melted out in the reference direction by the electric heating apparatus upon energization; this takes place in particularly simple fashion if, as preferred, in the context of a vehicle tank installed as intended in a vehicle in the normal position, the reference direction proceeds in the effective direction of gravity. A "projection" of an opening, here e.g. of the heating-apparatus opening, is understood in particular as a parallel projection, in the reference direction, of a cross-sectional surface, oriented perpendicularly to the reference direction, of the opening, the target surface onto which projection is occurring being a surface of the withdrawal arrangement. The statements made regarding the projection of surfaces also apply, *mutatis mutandis*, to the projection just presented.

The heat exchanger can also have a heat-exchanger opening which is embodied in a thickness direction of the heat exchanger and whose projection in the reference direction overlaps with the withdrawal arrangement. The result thereof is that a channel to the withdrawal arrangement in the frozen medium in the vehicle tank is melted out in the reference direction by the heat exchanger when the latter is supplied with a hot thermal fluid; this takes place in particularly simple fashion if, as preferred, in the context of a vehicle tank installed as intended in a vehicle in the normal position, the reference direction proceeds in the effective direction of gravity. If the heat exchanger is embodied from several separate parts spaced away from one another, an interstice between two of those parts which are directly adjacent to one another can constitute the heat-exchanger opening. In this case the heat-exchanger opening can be delimited, in the region in which it is not delimited by the individual parts of the heat exchanger, respectively by surfaces, in particular plane segments, that connect two individual parts of the heat exchanger. The heat-exchanger opening can also, in portions, not be surrounded by the heat exchanger in a circumferential direction. In this case the heat-exchanger opening can be delimited, in the region in a circumferential direction in which it is not delimited by the heat exchanger, by a surface, in particular a plane segment, delimited by the heat exchanger. The heat-exchanger opening is embodied in particular as a passthrough opening.

The heat exchanger can also itself surround the withdrawal opening at least in portions, in particular completely, in order to efficiently heat the withdrawal opening or a region in the vehicle tank which surrounds it. The heat exchanger can abut against the withdrawal opening or can be spaced away from the withdrawal arrangement.

In a preferred embodiment, the projection of the heating-apparatus opening in the reference direction and the projection of the heat-exchanger opening in the reference direction have a common overlap with the withdrawal opening. In this preferred embodiment, both the electric heating apparatus and the heat exchanger can assist one another in melting out a channel to the withdrawal arrangement in the frozen medium in the vehicle tank, which speeds up provision of the liquid medium to the withdrawal arrangement. A "projection" of a first opening onto a second opening in a reference direction is understood in particular as a parallel projection in the reference direction of a cross-sectional surface, oriented perpendicularly to the reference direction, of the first opening, the target surface onto which projection is occurring being a cross-sectional surface, oriented perpendicularly to the reference direction, of the second opening. The statements made with regard to surfaces also apply, *mutatis mutandis*, to the projection just presented.

The heat exchanger preferably comprises a thermal-fluid inlet, a thermal-fluid outlet, and a heating conduit, proceeding between the thermal-fluid inlet and the thermal-fluid outlet, for carrying a thermal fluid; the heat exchanger comprising a heat-exchanger opening embodied in a thickness direction of the heat exchanger; a portion of the heating conduit closest to the heat-exchanger opening (a portion having the shortest spacing from the heat-exchanger opening) having a spacing from the thermal-fluid inlet which is less than its spacing from the thermal-fluid outlet, the spacing being determined in each case along a thermal-fluid flow path in the heating conduit. The innermost portion (with respect to the heat-exchanger opening) of the heating conduit is thus located upstream from a middle of a thermal-fluid flow path and is thus supplied with a hotter thermal fluid than more than 50% of the heat exchanger. The frozen medium in the vehicle tank is correspondingly melted efficiently at the heat-exchanger opening. It is particularly preferred in this context that that portion of the heating conduit which is located closest to the heat-exchanger opening proceed along a portion of a circumference of the heat-exchanger opening.

In order to prevent the liquid medium received in the vehicle tank from exceeding a critical temperature as a result of the use of the heat exchanger, it is preferred that the heat exchanger comprise a thermal-fluid inlet; and that the vehicle tank comprise a thermostatically controlled valve, arranged upstream from the thermal-fluid inlet, whose function is preferably based on use of a wax or on use of an alloy having a shape memory. This allows a heating operation resulting from the thermal fluid to be stopped before the liquid medium reaches a temperature that is critical for that medium. Alternatively or additionally, the temperature of the thermal fluid delivered to the thermal-fluid inlet can be regulated and/or controlled by a regulating apparatus of the vehicle tank, or of the vehicle in which the vehicle tank is installed.

In a particularly preferred embodiment, the first heat-exchanger heat delivery surface and/or the first heating-apparatus heat delivery surface extends transversely, in particular at least in portions perpendicularly, to the reference direction. This permits the heat exchanger and the electric heating apparatus to interact in order to melt, over a large area, the frozen medium present in the tank.

The electric heating apparatus can furthermore encompass PTC elements, PTC elements being embodied in particular as elements that encompass PTC thermistors, preferably as heating elements. A heating operation by way of the electric heating apparatus can thereby be regulated down or in fact stopped before a critical temperature for the liquid medium present in the vehicle tank is reached.

In a preferred embodiment, the heat exchanger comprises a thermal-fluid inlet, a thermal-fluid outlet, and a heating conduit, proceeding between the thermal-fluid inlet and the thermal-fluid outlet, for carrying a thermal fluid along a thermal-fluid flow path; the heat exchanger comprising a heat-exchanger opening embodied in a thickness direction of the heat exchanger; and the heating conduit encompassing at least two extent portions located one behind another in a radial direction of the heat-exchanger opening, preferably encompassing extent portions located next to one another in a radial direction of the heat-exchanger opening, in which portions the thermal-fluid flow path proceeds transversely, in particular perpendicularly, to the radial direction of the heat-exchanger opening. This arrangement permits a high level of heat transfer per unit area of the heat exchanger by way of a high conduit density per unit area. The heat-exchanger opening can in particular define a cylindrical coordinate system, the Z direction in particular proceeding parallel to the reference direction. A radial direction of the heat-exchanger opening proceeds in particular perpendicularly to a straight line that proceeds parallel to the reference direction and that preferably proceeds through a center, determined for example by definition of a center point of the cavity of the heat-exchanger opening, of the heat-exchanger opening.

It is preferred that the electric heating apparatus and/or the heat exchanger each be embodied in planar fashion. The electric heating apparatus can be embodied in particular as a plate or a flexible film on which are arranged PTC thermistors connected to one another and constituting heating elements, with the result that a planar conformation of the electric heating apparatus is achieved.

A planar conformation of the heat exchanger can be achieved by the fact that the heating conduit encompasses at least one triplet of three extent portions located next to one another in a radial direction, the triplet encompassing two pairs of the extent portions located next to one another in a radial direction; in each pair, the two extent portions located next to one another each being directly adjacent to one another; a plane proceeding transversely, in particular perpendicularly, to the thermal-fluid flow path defining, in each extent portion of the triplet, a respective cross-sectional area of the heating conduit; each cross-sectional surface of the heating conduit having a surface center point; and in the triplet, the surface center points of directly adjacent extent portions defining two intersecting line segments that intersect at an angle of between 150 and 180 degrees, preferably 165 and 180 degrees, particularly preferably between 175 and 170 degrees or between 177.5 and 180 degrees. It is preferred that the heat exchanger encompass a plurality of triplets, two different adjacent triplets preferably having in common at least one, preferably two extent portions.

In a particularly preferred embodiment, the heat exchanger comprises a thermal-fluid inlet, a thermal-fluid outlet, and a heating conduit, proceeding between the thermal-fluid inlet and the thermal-fluid outlet, for carrying a thermal fluid; and the heat exchanger comprising a heat-exchanger opening embodied in a thickness direction of the heat exchanger; the heat exchanger encompassing a winding section that encompasses a first extent portion of the heating conduit, a redirecting portion of the heating conduit, and a second extent portion of the heating conduit, which together constitute a continuous portion of the heating conduit which is continuously passable for the thermal fluid along a thermal-fluid flow path proceeding in the winding section; when a thermal-fluid flow is present in the winding section, a first direction of the thermal-fluid flow in the first extent portion pointing away from a second direction of the thermal-fluid flow in the second extent portion (e.g. the unit vectors representing the first and the second direction have a negative scalar product); and preferably the first direction of the thermal-fluid flow enclosing with the second direction of the thermal-fluid flow an angle of between 135° and 180°, in particular an angle of between 170° and 180°, particularly preferably an angle of substantially 180°. This arrangement permits a high level of heat transfer per unit area of the heat exchanger by way of a high conduit density per unit area. In particular, a continuous interconnected thermal-fluid flow path for influencing the spatial temperature distribution within the heat exchanger can be constituted. The heat exchanger can encompass a plurality of winding sections, preferably at least one pair of winding sections having a common extent portion.

The planar heat exchanger is, in particular, planar, and is also associated with the advantages described above, if the heat exchanger has a virtual heat-exchanger envelope, the heat-exchanger envelope being a three-dimensional body whose outer surface encompasses and/or is constituted by a first heat-exchanger envelope surface, a second heat-exchanger envelope surface arranged oppositely from the first heat-exchanger envelope surface, and a heat-exchanger envelope periphery surface connecting the first heat-exchanger envelope surface and the second heat-exchanger envelope surface; an extent of the heat-exchanger envelope along each of two mutually perpendicular surface directions that each proceed, at a point on the first heat-exchanger envelope surface, tangentially to the first heat-exchanger envelope surface being several times, preferably more than three times, more than 10 times, or more than 20 times, greater than an extent of the heat exchanger in a thickness direction of the heat exchanger which is preferably perpendicular to the first heat-exchanger envelope surface, in particular at the point.

It is preferred that the heat exchanger be arranged in the heat-exchanger envelope; and/or that the first heat-exchanger envelope surface proceed tangentially to a plurality of points on the first heat-exchanger heat delivery surface; and/or that the heat exchanger comprise a second heat-exchanger heat delivery surface arranged oppositely from the first heat-exchanger heat delivery surface, and that the second heat-exchanger envelope surface proceed tangentially to a plurality of points on the second heat-exchanger heat delivery surface; and/or that each spacing of the first heat-exchanger envelope surface from the second heat-exchanger envelope surface lie within a range from 75% to 125% of an average spacing between the first heat-exchanger envelope surface and the second heat-exchanger envelope surface; and/or that the first heat-exchanger envelope surface lie substantially parallel to the second heat-exchanger envelope surface.

The above-described advantages of the vehicle tank also transfer to a vehicle in which the above-described vehicle tank is used. For that purpose, a vehicle having a vehicle tank for receiving a liquid medium is furnished; the vehicle tank being embodied as a vehicle tank as described above; the vehicle preferably having a vehicle reference direction substantially parallel to the effective direction of gravity with the vehicle in a normal position; the vehicle in the normal position preferably standing, in an operationally ready state, on a flat surface that extends perpendicularly to the effective direction of gravity; and further preferably, the reference direction of the vehicle tank coinciding with the vehicle reference direction.

Although the invention is not limited to embodiment of the tank wall as a tank bottom, that represents the preferred embodiment. These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED
EMBODIMENTS

Figure 1:
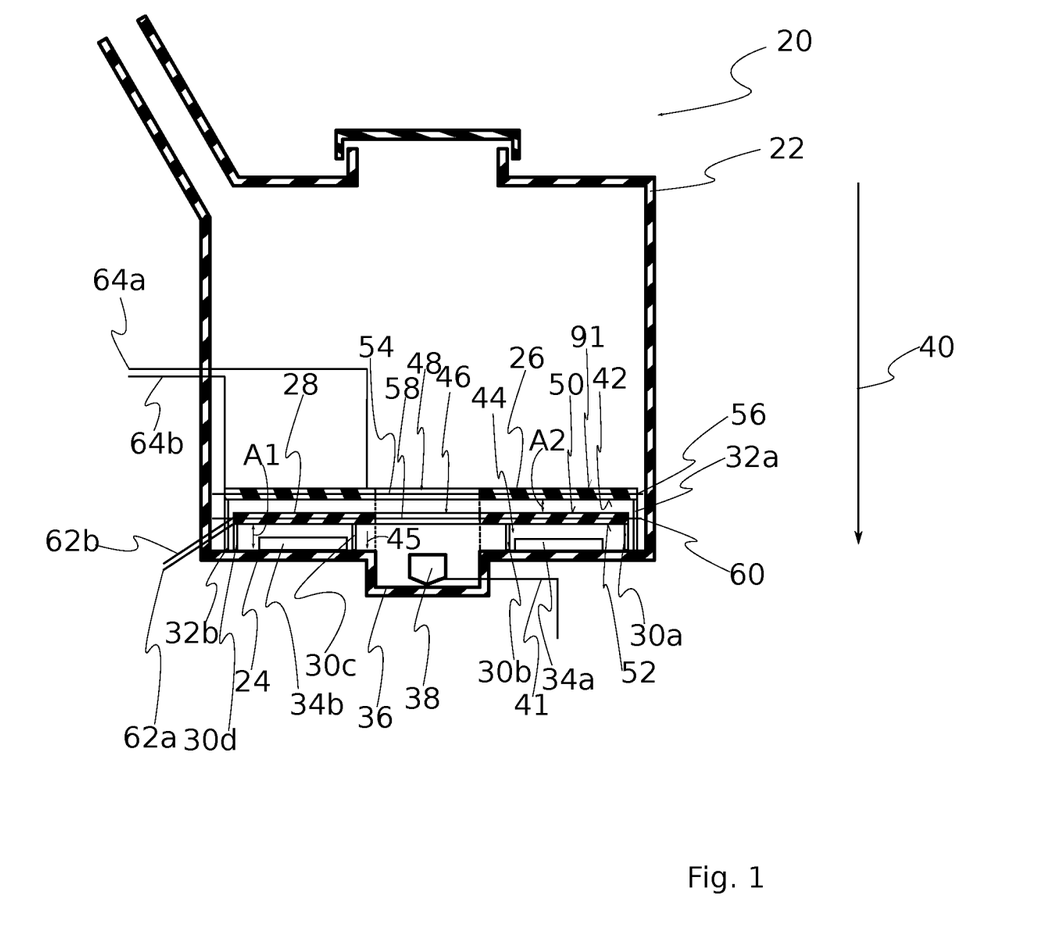
FIG. 1 is a schematic cross section of an embodiment of a vehicle tank according to the present invention.

Referring now to the drawings wherein the showings are for the purpose of illustrating preferred and alternative embodiments of the invention only and not for the purpose of limiting the same, FIG. 1 shows a vehicle tank 20 for receiving a liquid medium (not shown) such as water or an aqueous urea solution. Vehicle tank 20 encompasses a tank body 22 having a tank bottom 24 that is an embodiment of a tank wall, as well as a heat exchanger 26 and an electric heating apparatus 28 arranged in the interior of the tank body. Electric heating apparatus 28 is arranged spaced away from tank bottom 24, and is retained in that position by struts or pegs 30a to 30d. Heat exchanger 26 is likewise arranged spaced away from tank bottom 24 and from the remainder of tank 20, and is retained in that position by pegs or struts 32a and 32b. Heat exchanger 26 preferably proceeds parallel to tank bottom 24 and/or to electric heating apparatus 28, which preferably also proceeds parallel to tank bottom 24. Arranged on tank bottom 24 are struts 34a, 34b that can stiffen the tank bottom and can reduce a sloshing motion of the liquid medium.

The tank bottom comprises a vehicle tank sump 36, embodied as a depression, at whose deepest point is provided a withdrawal apparatus 38, embodied as a filter and arranged at the end of a schematically depicted withdrawal conduit 41, for withdrawing the liquid medium from tank 20.

When vehicle tank 20 is installed as intended in a vehicle standing on a flat and horizontally arranged surface, a reference direction 40 of vehicle tank 20 preferably proceeds parallel to the effective direction of gravity and is aligned with the effective direction of gravity. Heat exchanger 26, electric heating apparatus 28, and tank bottom 24 are arranged successively to one another in the reference direction, preferably oriented transversely or perpendicularly to reference direction 40, so that heating apparatus 28 is arranged between heat exchanger 26 and tank bottom 24. Heat exchanger 26 comprises a first heat-exchanger heat delivery surface 42 that is spaced away from tank bottom 24 and faces toward electric heating apparatus 28. Electric heating apparatus 28 is arranged in a gap 44 which is arranged between first heat-exchanger heat delivery surface 42 and tank bottom 24, and which defines a gap thickness direction 45 that is preferably parallel to reference direction 40 and is preferably perpendicular respectively to tank bottom 24 and/or to first heat-exchanger heat delivery surface 42 and to electric heating apparatus 28.

Electric heating apparatus 28 and heat exchanger 26 can each be embodied substantially as a planar body, in particular substantially as a planar cuboid.

Electric heating apparatus 28 comprises a heating-apparatus opening 46 embodied in its thickness direction, and heat exchanger 26 comprises a heat-exchanger opening 48 embodied in its thickness direction, which align when viewed in the reference direction and are preferably each embodied as a cylindrical opening. When viewed in reference direction 40, heating-apparatus opening 46 surrounds withdrawal apparatus 38, which can extend parallel to reference direction 40 sufficiently far that it passes through heating-apparatus opening 46. In this case as well, in which an object passes through an opening, the projection of that opening in the reference direction is intended to be regarded as overlapping with that object.

If first heat-exchanger heat delivery surface 42 is projected in the reference direction onto a first heating-apparatus heat delivery surface 50, facing toward it, of electric heating apparatus 28, that projection completely overlaps first heating-apparatus heat delivery surface 28 and thus defines, on the entire first heating-apparatus heat delivery surface 50, an overlap region of that surface.

Struts or pegs 30a to 30b and struts or pegs 32a and 32b are dimensioned in terms of length in such a way that spacing A1 between a second heating-apparatus heat delivery surface 52 and tank bottom 24 outside vehicle tank sump 36 is equal to approximately 10 mm, and spacing A2 between first heat-exchanger heat delivery surface 42 and first heating-apparatus heat delivery surface 50, constituting the overlap region, is equal to approximately 15 mm. Because the inner surface of tank bottom 24, outside vehicle tank sump 36; first heat-exchanger heat delivery surface 42; second heating-apparatus heat delivery surface 52; and first heating-apparatus heat delivery surface 50 are preferably oriented in parallel fashion, the aforementioned spacings also indicate the maximum spacings.

If heat-exchanger opening 48 is projected in reference direction 40, the projection operation can proceed from a cross-sectional surface 54 of that opening which is defined by a plane 56 proceeding perpendicularly to the drawing plane of FIG. 1. The edge rays of the projected image are indicated by dashed lines. This projection overlaps both with withdrawal apparatus 38 and with heating-apparatus opening 46; what is regarded as the target surface in the context of projection onto heating-apparatus opening 46 is the latter's cross-sectional surface 58 that is defined by a plane 60 proceeding perpendicularly to the drawing plane of FIG. 1. The projection of heating-apparatus opening 46 in reference direction 40 (which can be based on cross-sectional surface 58) also overlaps with withdrawal apparatus 38. Because heating-apparatus opening 46 aligns with heat-exchanger opening 48 when viewed in reference direction 40, their projections onto withdrawal apparatus 38 overlap completely.

Power connectors 62a, 62b to electric heating apparatus 28, and a cooling-water inflow 64a and cooling-water outflow 64b to the heat exchanger, are depicted merely schematically in FIG. 1 and in the further Figures, and a plurality of power connectors, and a plurality of cooling-water inflows and cooling-water outflows on the heat exchanger, can be provided.

Figure 2:
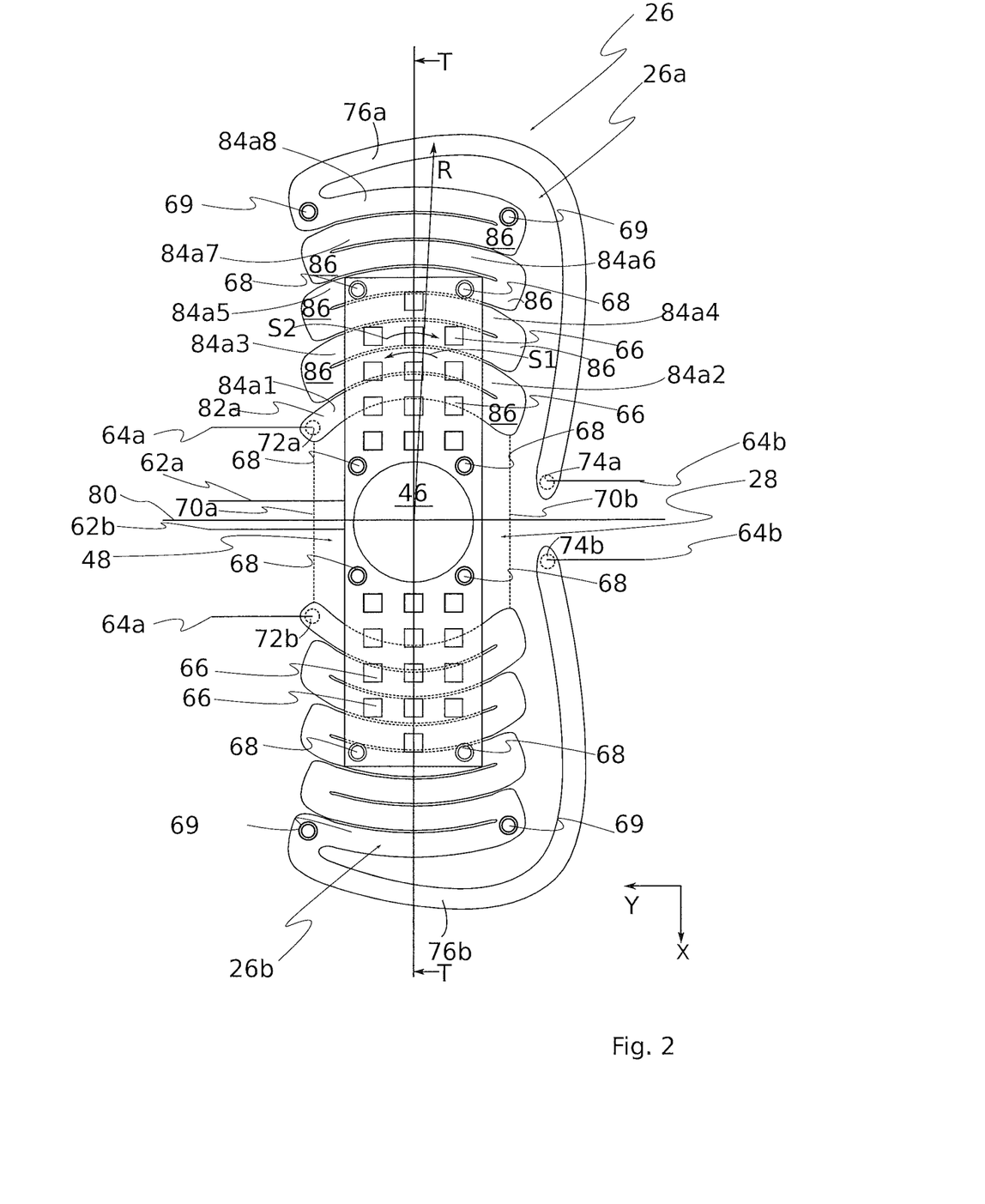
FIG. 2 is a view, in a direction opposite to a reference direction, of an embodiment of an electric heating apparatus and of a heat exchanger, which can be used individually or together in the embodiment of FIG. 1.

FIG. 2 is a view, oppositely from reference direction 40, toward a possible embodiment of heat exchanger 26 and electric heating apparatus 28 shown in FIG. 1. The overlap region of first heating-apparatus heat delivery surface 50 is, however, smaller than the entire first heating-apparatus heat delivery surface 50, as is readily apparent.

Electric heating apparatus 28 encompasses a plurality of electrically interconnected PTC thermistors constituting heating elements 66, only a few of the heating elements being labeled with a reference character in the interest of clarity. In order to receive pegs, such as pegs 30a to 30d, for retaining heating apparatus 28, corresponding receptacles 68 are provided in electric heating apparatus 28 that is embodied as a plate, and thus in particular in planar fashion. Corresponding receptacles 69 for receiving pegs, such as pegs 32a, 32b, for retaining heat exchanger 26 are provided on heat exchanger 26.

Heat exchanger 26 is embodied from two separate individual parts 26a and 26b, and has a heat-exchanger opening 48 that is delimited by individual parts 26a and 26b and by two plane segments 70a and 70b that proceed perpendicularly to the drawing plane of FIG. 2 and connect the respective individual parts 26a and 26b to one another.

Each of the individual heat-exchanger parts 26a, 26b comprises a thermal-fluid inlet 72a, 72b, a thermal-fluid outlet 74a, 74b, and a heating conduit 76a, 76b that proceeds between the respective thermal-fluid inlet 72a, 72b and the respective thermal-fluid outlet 74a, 74b. Individual heat-exchanger parts 26a, 26b are embodied substantially mirror-symmetrically with respect to a plane 80 proceeding perpendicularly to the drawing plane of FIG. 2, so that only individual part 26a will be described in further detail below, and the description also applies to individual part 26b. A thermal-fluid inlet and/or thermal-fluid outlet can be embodied with a metal reinforcement.

Innermost portion 82a of heating conduit 76a proceeds along a periphery of heat-exchanger opening 48. Since thermal-fluid inlet 72a is embodied directly on innermost portion 82a, its spacing from thermal-fluid inlet 72a along the thermal-fluid flow path proceeding in heating conduit 76a is less than from thermal-fluid outlet 74a. The heating conduit can have an inside diameter of 6 mm, a wall thickness of 1.7 mm, and a minimum radius of curvature greater than or equal to 8 mm.

Heating conduit 76a encompasses extent portions 84a1 to 84a8, of which respective pairs 84a1 and 84a2; 84a2 and 84a3; 84a3 and 84a4; 84a4 and 84a5; 84a5 and 84a6; 84a6 and 84a7; and 84a7 and 84a8 are each made up of extent portions directly adjacent with reference to a radial direction R of the periphery of heat-exchanger opening 48. In such a pair, the thermal-fluid flow path of the thermal fluid proceeds in the respective individual extent portions transversely, preferably perpendicularly, to radial direction R, as indicated in extent portions 84a2 and 84a3 by arrows S1 and S2.

A pair of directly adjacent extent portions is connected by a respective redirecting portion 86, and constitutes with it a winding section that is continuously passable for the thermal fluid and thus also for its thermal-fluid flow path, two adjacent winding sections each comprising a shared extent portion. In a winding section, the thermal fluid flows in the extent portions respectively in directions pointing away from one another (see arrows S1 and S2), the directions enclosing an angle of at least 135 to 180°, in FIG. 2 substantially 180°.

Figure 3:
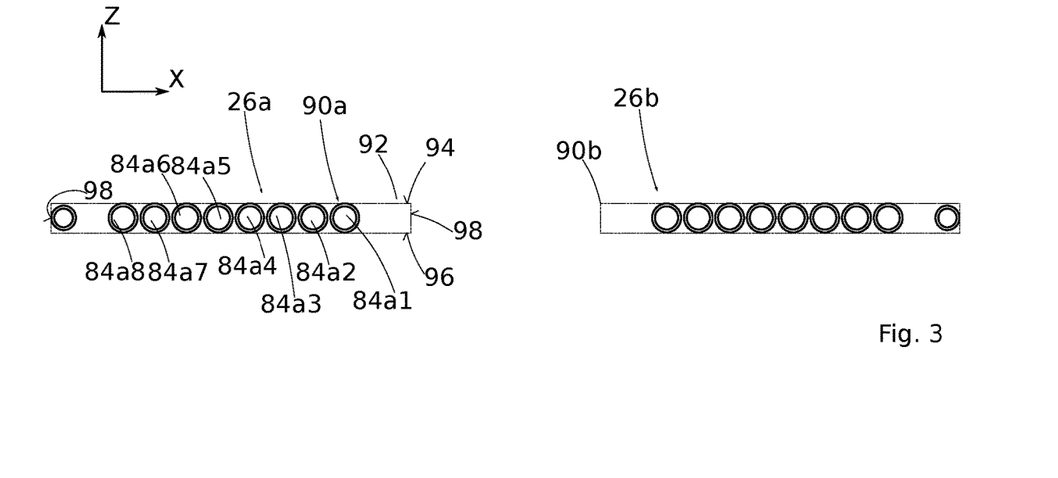
FIG. 3 is a schematic view of a cross section of an embodiment of the heat exchanger of FIG. 2.

FIG. 3 schematically depicts a cross section T-T of heat exchanger 26 of FIG. 2, only the sectioned surfaces of the extent portions being depicted. To ensure clarity, shading of the sectioned surfaces has been omitted in FIG. 3 and in FIGS. 4 and 5.

Each individual part 26a and 26b of the heat exchanger can be completely enclosed by a cuboidally shaped virtual heat-exchanger envelope 90a, 90b that is indicated with dotted lines in FIG. 3. A virtual heat-exchanger envelope can also be assembled from the two cuboidally shaped virtual heat-exchanger envelopes 90a, 90b. Because of the mirror symmetry with respect to plane 80 of heat exchanger 26, that symmetry also transfers to envelopes 90a, 90b, so that once again only envelope 90a will be described and those statements also apply to envelope 90b.

Heat-exchanger envelopes 90a, 90b each have an outer surface 92 having a first heat-exchanger envelope surface 94, a second heat-exchanger envelope surface 96 arranged oppositely from first heat-exchanger envelope surface 94, and a heat-exchanger envelope periphery surface 98 connecting the first heat-exchanger envelope surface and the second heat-exchanger envelope surface. These surfaces are each merely indicated in FIG. 3, but the shape of a cuboid is known. If the virtual heat-exchanger envelope is assembled from virtual heat-exchanger envelopes 90a, 90b, then the first heat-exchanger envelope surface is assembled from the first heat-exchanger envelope surfaces of heat-exchanger envelopes 90a, 90b, the second heat-exchanger envelope surface is assembled from the second heat-exchanger envelope surfaces of heat-exchanger envelopes 90a, 90b, and the same is analogously the case for the heat-exchanger envelope periphery surface.

The extent of the heat-exchanger envelope in the X direction that is depicted, which proceeds parallel to the first heat-exchanger envelope surface, is more than three times greater than the extent of the heat-exchanger envelope in the Z direction that is depicted. The same is true of the ratio of the extent of the heat-exchanger envelope in the Y direction proceeding perpendicularly to the drawing plane of FIG. 3.

Heat-exchanger envelope 90a, 90b proceeds tangentially to points on the extent portions at which they contact the latter. Those points are part of the first heat-exchanger heat delivery surface and of a second heat-exchanger heat delivery surface 91, arranged oppositely from the first heat-exchanger heat delivery surface, of heat exchanger 26.

Figure 4:
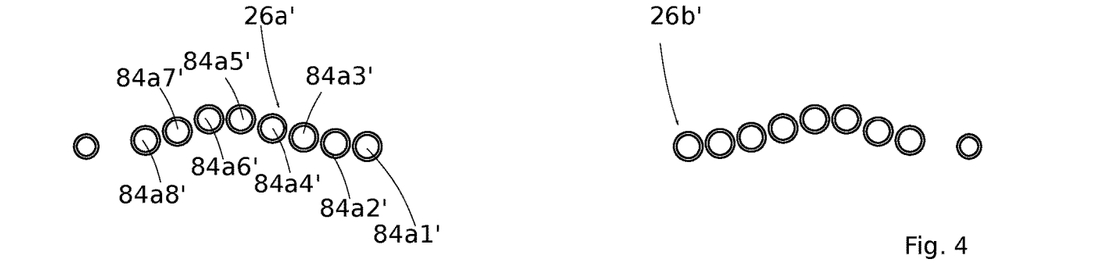
FIG. 4 is a schematic view of a cross section of a further embodiment of the heat exchanger of FIG. 2.
Figure 5:
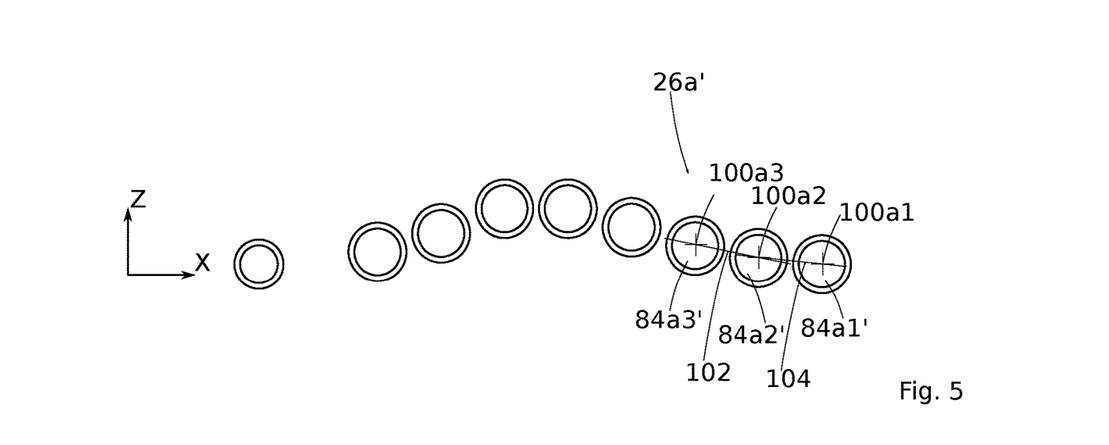
FIG. 5 is an enlarged partial view of the cross section of FIG. 4.

FIG. 4 schematically depicts a cross section T-T of an embodiment of heat exchanger 26 of FIG. 2 having an alternative arrangement of extent portions in a Z direction, only the sectioned surfaces of the extent portions being depicted. Those reference characters which identify elements embodied differently from the embodiment of FIG. 3 have been marked with an apostrophe ('). With regard to the remainder of the configuration, reference is made explicitly to the statements regarding FIGS. 1 to 3, which apply here as well. Parts 26a' and 26b' of the heat exchanger are mirror-symmetrical in the embodiment of FIG. 4 as well, but that need not be the case.

Considering a triplet of three extent portions 84a1', 84a2', 84a3' adjacent in a radial direction of the heat-exchanger opening, it encompasses two pairs 84a1' and 84a2', and 84a2' and 84a3', of extent portions directly adjacent to one another. The sectioned surfaces resulting from the T-T section which are shown proceed perpendicularly to the thermal-fluid flow path in heating conduit 76a, and define respective cross-sectional surfaces of the heating conduit having surface center points 100a1 to 100a3. Respective straight line segments 102 and 104, which intersect at an angle of 6.5° as shown in the enlargement of FIG. 4 shown in FIG. 5, extend between surface center points 100a1 and 100a2, and 100a2 and 100a3. Such an arrangement ensures that adjacent extent portions are not too far away from one another and heat exchanger 26 is correspondingly embodied in planar fashion.

Several such triplets can of course be present adjacently to one another, and can have extent portions, or in fact a pair of extent portions, in common with one another.

Figure 6:
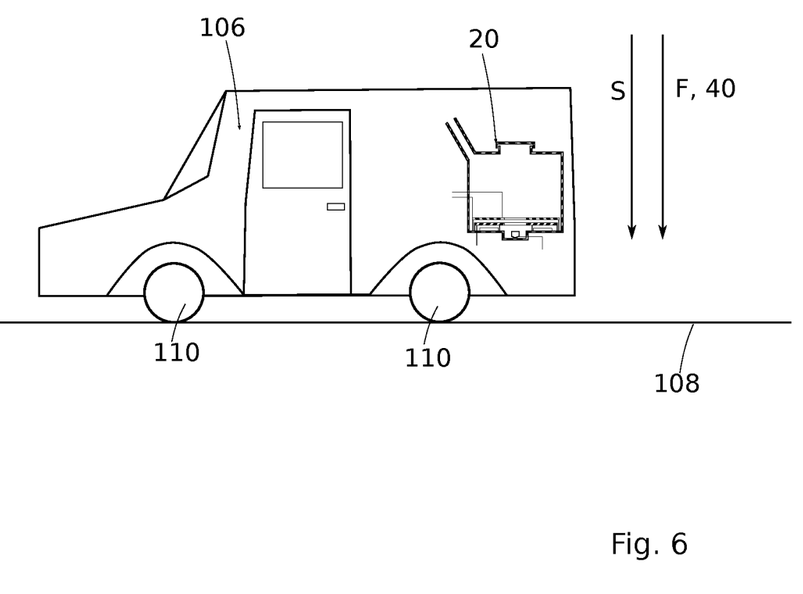
FIG. 6 is a schematic view of a vehicle according to the present invention in a normal position.

FIG. 6 shows a vehicle 106 that is in a normal position, i.e. it is standing on a flat surface 108 that extends perpendicularly to effective direction of gravity S, in an operationally ready state, i.e. in particular is standing on wheels 110 provided for forward motion. The vehicle has a vehicle reference direction F that, in a normal position, proceeds parallel to effective direction of gravity S. A vehicle tank 20 is built into vehicle 106 (as indicated merely schematically in FIG. 6) in such a way that reference direction 40 of vehicle tank 20 coincides with vehicle reference direction F.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A vehicle tank for receiving a liquid medium, encompassing:
   a tank body having a tank wall;
   a heat exchanger arranged in an interior of the tank body, the heat exchanger being planar and having an external shape of a plate; the heat exchanger comprising a first heat-exchanger heat delivery surface that faces toward the tank wall and is spaced away from the tank wall; and an electric heating apparatus that is arranged in the interior of the tank body, wherein the electric heating apparatus is arranged between the first heat-exchanger heat delivery surface and the tank wall.

2. The vehicle tank according to claim 1, wherein a gap that defines a gap thickness direction being embodied between the first heat-exchanger heat delivery surface and the tank wall, the vehicle tank having a reference direction proceeding parallel to the gap thickness direction;

when the vehicle tank is installed as intended in an associated vehicle, the reference direction extending parallel to a vehicle reference direction, the vehicle reference direction being substantially parallel to the effective direction of gravity in a normal position of the associated vehicle, the associated vehicle, in the normal position in an operationally ready state, standing on a flat surface that extends perpendicularly to the effective direction of gravity.

3. The vehicle tank according to claim 2, wherein the electric heating apparatus comprising a first heating-apparatus heat delivery surface facing toward the first heat-exchanger heat delivery surface; and a projection of the first heat-exchanger heat delivery surface in the reference direction at least partly overlapping the first heating-apparatus heat delivery surface in an overlap region of the first heating-apparatus heat delivery surface.

4. The vehicle tank according to claim 3, wherein the electric heating apparatus comprising a second heating-apparatus heat delivery surface arranged oppositely from the first heating-apparatus heat delivery surface; and a ratio of a first maximally occurring spacing between the second heating-apparatus heat delivery surface and the tank wall to a second maximally occurring spacing between the overlap region and the first heat-exchanger heat delivery surface being less than 5.

5. The vehicle tank according to claim 3, wherein the first heat-exchanger heat delivery surface and/or the first heating-apparatus heat delivery surface extending transversely to the reference direction.

6. The vehicle tank according to claim 2, wherein the electric heating apparatus comprising a heating-apparatus opening which is embodied in a thickness direction of the electric heating apparatus and whose projection in the reference direction overlaps with a withdrawal arrangement of the vehicle tank.

7. The vehicle tank according to claim 6, wherein the heat exchanger having a heat-exchanger opening which is embodied in a thickness direction of the heat exchanger and whose projection in the reference direction overlaps with a withdrawal arrangement of the vehicle tank and wherein the projection of the heating-apparatus opening in the reference direction and the projection of the heat-exchanger opening in the reference direction having a common overlap with the withdrawal arrangement.

8. The vehicle tank according to claim 2, wherein the heat exchanger having a heat-exchanger opening which is embodied in a thickness direction of the heat exchanger and whose projection in the reference direction overlaps with a withdrawal arrangement of the vehicle tank.

9. The vehicle tank according to claim 2, wherein the first heat-exchanger heat delivery surface and/or a first heating-apparatus heat delivery surface extending transversely to the reference direction.

10. The vehicle tank according to claim 2, wherein the vehicle tank furthermore encompassing a withdrawal arrangement, arranged on the tank body, for withdrawing an associated liquid medium from the tank body; and the electric heating apparatus surrounding the withdrawal arrangement at least in portions.

11. The vehicle tank according to claim 10, wherein the electric heating apparatus comprising a heating-apparatus opening which is embodied in a thickness direction of the electric heating apparatus and whose projection in the reference direction overlaps with the withdrawal arrangement.

12. The vehicle tank according to claim 11, wherein the heat exchanger having a heat-exchanger opening which is embodied in a thickness direction of the heat exchanger and whose projection in the reference direction overlaps with the withdrawal arrangement and wherein the projection of the heating-apparatus opening in the reference direction and the projection of the heat-exchanger opening in the reference direction having a common overlap with the withdrawal arrangement.

13. The vehicle tank according to claim 10, wherein the heat exchanger having a heat-exchanger opening which is embodied in a thickness direction of the heat exchanger and whose projection in the reference direction overlaps with the withdrawal arrangement.

14. The vehicle tank according to claim 1, wherein the heat exchanger comprising a thermal-fluid inlet, a thermal-fluid outlet, and a heating conduit, proceeding between the thermal-fluid inlet and the thermal-fluid outlet, for carrying an associated thermal fluid; and the heat exchanger comprising a heat-exchanger opening embodied in a thickness direction of the heat exchanger; a portion of the heating conduit closest to the heat-exchanger opening having a spacing from the thermal-fluid inlet which is less than its spacing from the thermal-fluid outlet, the spacing being determined in each case along a thermal-fluid flow path in the heating conduit.

15. The vehicle tank according to claim 1, wherein the electric heating apparatus encompassing PTC elements.

16. The vehicle tank according to claim 1, wherein the heat exchanger comprising a thermal-fluid inlet, a thermal-fluid outlet, and a heating conduit, proceeding between the thermal-fluid inlet and the thermal-fluid outlet, for carrying a thermal fluid along a thermal-fluid flow path;

the heat exchanger comprising a heat-exchanger opening embodied in a thickness direction of the heat exchanger; and the heating conduit encompassing at least two extent portions located one behind another in a radial direction of the heat-exchanger opening, in which portions the thermal-fluid flow path proceeds transversely to the radial direction of the heat-exchanger opening.

17. The vehicle tank according to claim 1, wherein the heat exchanger comprising a thermal-fluid inlet, a thermal-fluid outlet, and a heating conduit, proceeding between the thermal-fluid inlet and the thermal-fluid outlet, for carrying a thermal fluid; and the heat exchanger comprising a heat-exchanger opening embodied in a thickness direction of the heat exchanger;

the heat exchanger encompassing a winding section that encompasses a first extent portion of the heating conduit, a redirecting portion of the heating conduit, and a second extent portion of the heating conduit, which together constitute a continuous portion of the heating conduit which is continuously passable for the thermal fluid along a thermal-fluid flow path proceeding in the winding section; when a thermal-fluid flow is present in the winding section, a first direction of the thermal-fluid flow in the first extent portion pointing away from a second direction of the thermal-fluid flow in the second extent portion.

18. The vehicle tank according to claim 1, wherein the heat exchanger having a virtual heat-exchanger envelope;

the heat-exchanger envelope being a three-dimensional body whose outer surface encompasses and/or is constituted by a first heat-exchanger envelope surface, a second heat-exchanger envelope surface arranged oppositely from the first heat-exchanger envelope surface, and a heat-exchanger envelope periphery surface connecting the first heat-exchanger envelope surface and the second heat-exchanger envelope surface;

an extent of the heat-exchanger envelope along each of two mutually perpendicular surface directions that each proceed, at a point on the first heat-exchanger envelope surface, tangentially to the first heat-exchanger envelope surface, being several times greater than an extent of the heat exchanger in a thickness direction of the heat exchanger.

19. A vehicle having a vehicle tank for receiving a liquid medium, wherein the vehicle tank is embodied as a vehicle tank according to claim 2; the vehicle having a vehicle reference direction substantially parallel to the effective direction of gravity with the vehicle in a normal position; the vehicle in the normal position standing on a flat surface that extends perpendicularly to the effective direction of gravity; and the reference direction of the vehicle tank coinciding with the vehicle reference direction.

20. The vehicle tank according to claim 1, wherein the tank wall is a tank bottom.

* * * * *